INVENTOR.
SHIRO OKAMURA
BY Roy C. Haygood
ATTORNEY

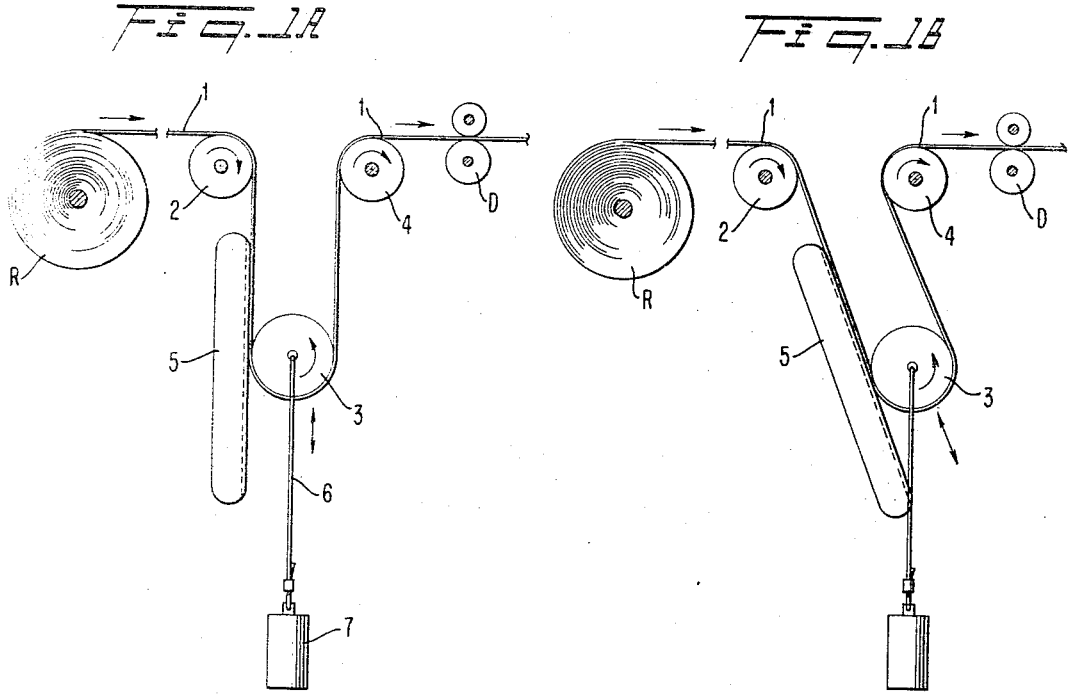
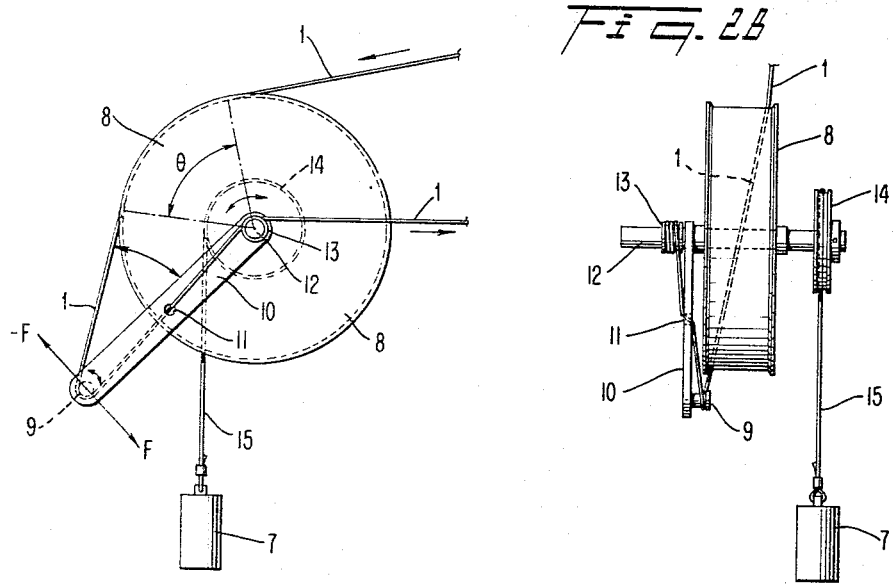

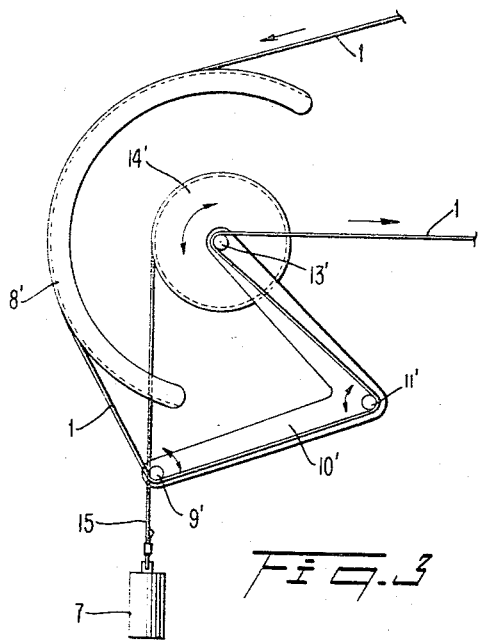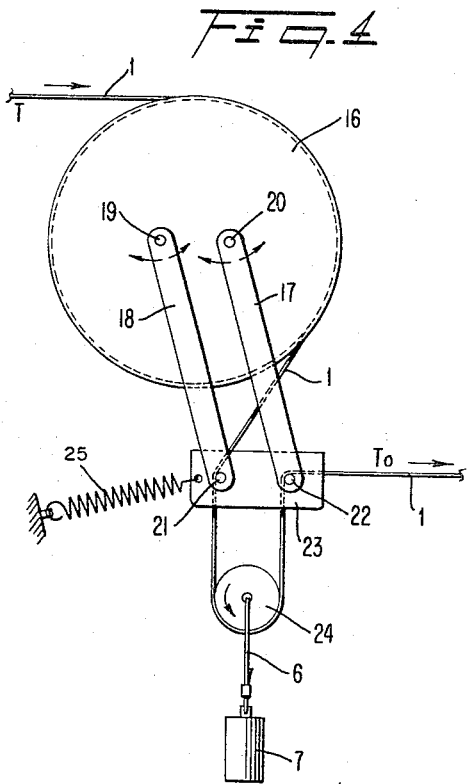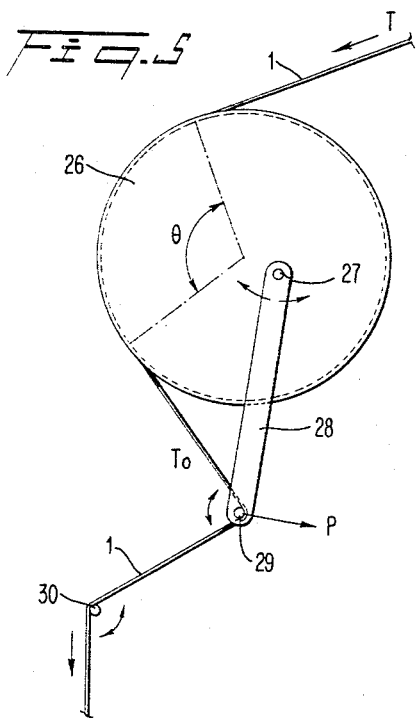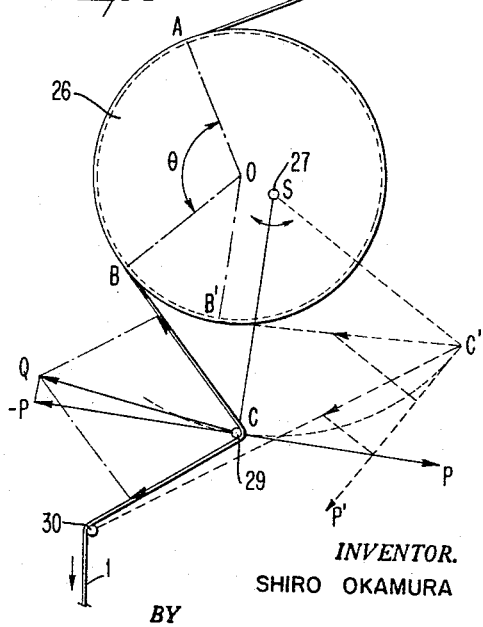

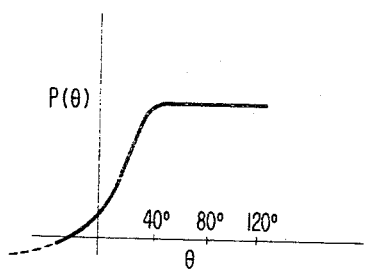
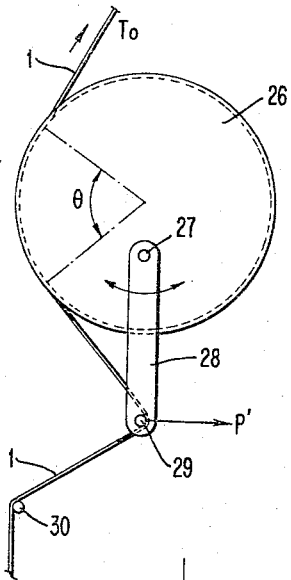
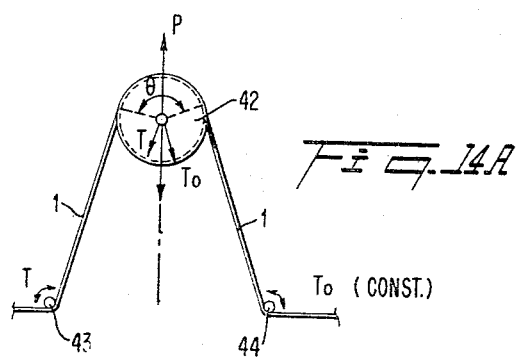
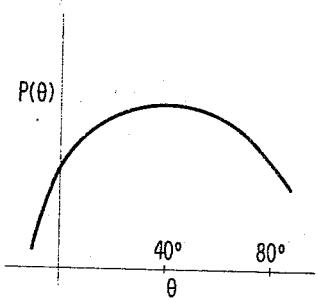
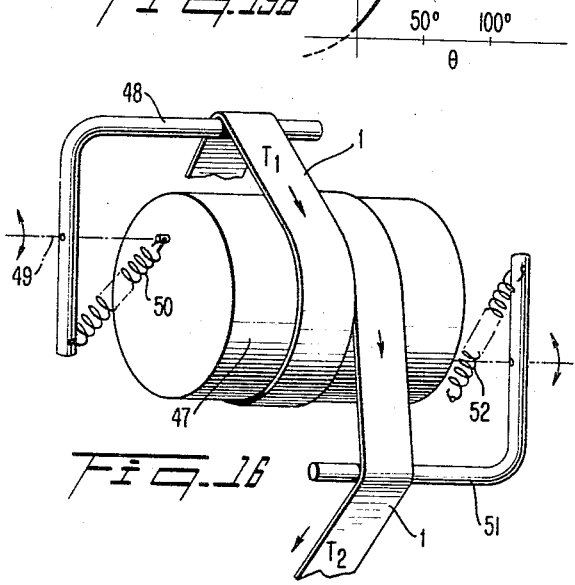
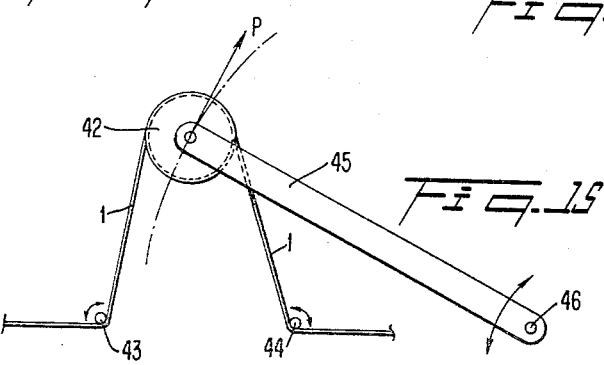
INVENTOR.
SHIRO OKAMURA July 18, 1967 SHIRO OKAMURA 3,331,568
TENSION DRIVE SYSTEM AND TENSION REGULATOR MECHANISM
FOR RELATIVELY THIN MATERIALS
Original Filed May 19, 1961 5 Sheets-Sheet 5
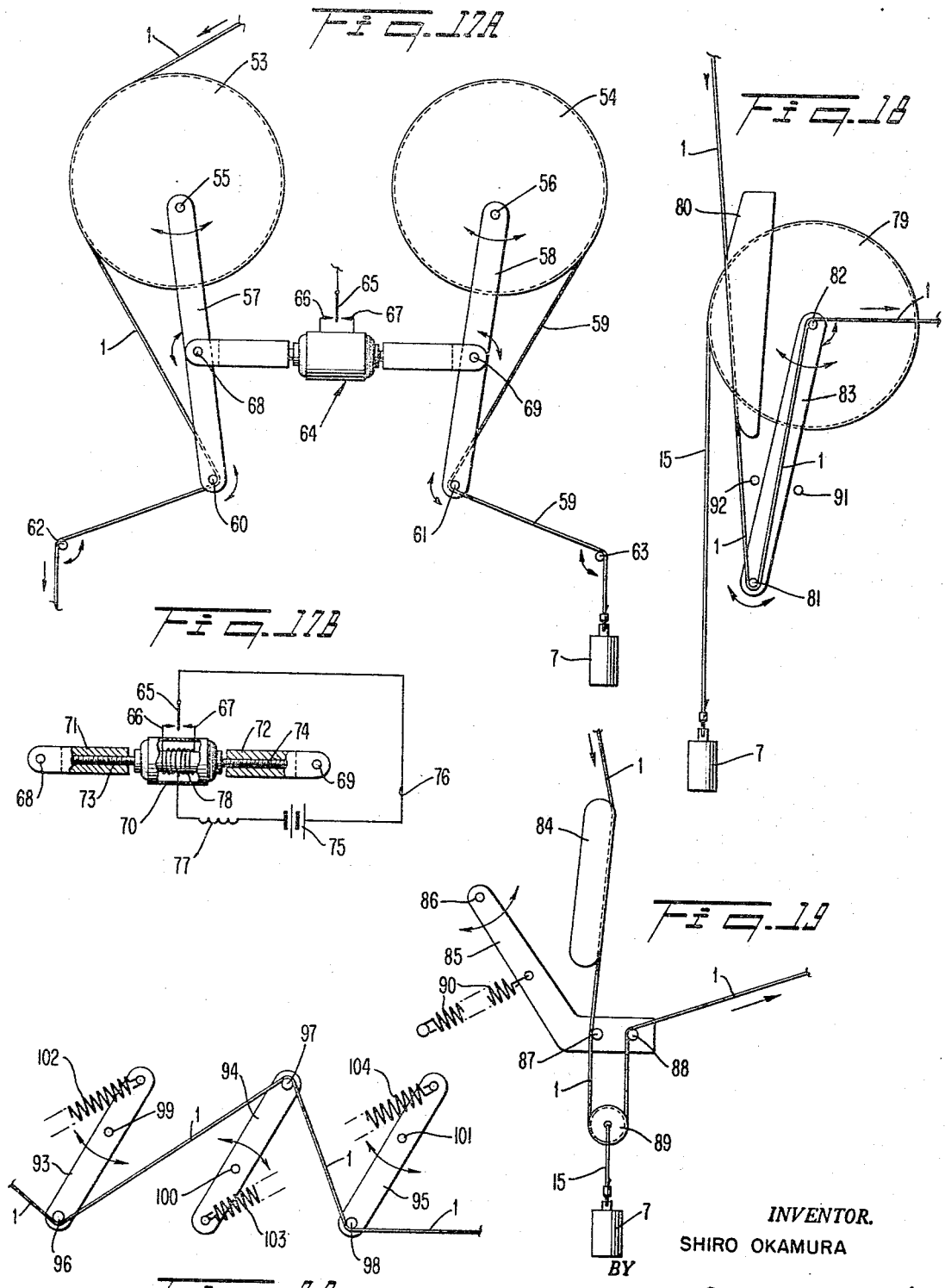
INVENTOR.
SHIRO OKAMURA
BY
Roy C. Hopgood
ATTORNEY United States Patent Office 3,331,568
Patented July 18, 1967

3,331,568
TENSION DRIVE SYSTEM AND TENSION REGULATOR MECHANISM FOR RELATIVELY THIN MATERIALS
Shiro Okamura, % Nippon Electric Company Ltd., 2 Shiba Mita Shikokumachi Minatoku, Tokyo, Japan
Original application May 19, 1961, Ser. No. 111,367. Divided and this application Feb. 11, 1964, Ser. No. 363,034
Claims priority, application Japan, May 23, 1960, 35/25,551; Oct. 24, 1960, 35/43,154
4 Claims. (Cl. 242—154)

This is a division of application Ser. No. 111,367, filed May 19, 1961, now abandoned.

This invention relates to a tension drive system and tension regulator mechanism for relatively thin materials such as wire, paper, magnetic tape, thread, rope, or the like. The invention is useful in wire drawing machines, printing presses, solenoid winding machines, magnetic tape recorders, textile weaving machines, and other machines or applications in which relatively thin materials are drawn by tension from one location to another. The invention is characterized by novel means for maintaining a constant, predetermined tension in the material under wide variations in the driving force applied thereto or the load thereon.

In many diverse branches of science and technology it is necessary to maintain the tension in some relatively thin material at a constant, predetermined level under wide variations of load or driving force. For example, any variation of wire tension in a solenoid winding machine will cause variations in the electrical characteristics of the solenoids wound thereby. Any variation of paper tension in a cylindrical printnig press will at best blur the printing thereon and at worst break the paper and disrupt the printing operation. Any variation of wire tension in a wire drawing machine will cause variations in the diameter and strength of wire drawn thereby. And any variation of tape tension in a magnetic recording or reproducing system will cause wow or flutter in the signal recorded or reproduced thereby.

Many different tension regulator devices have been constructed in the past to meet the above noted needs. Most of these prior art devices are electro-mechanical servo systems containing a tension transducer for sensing variations of tension in the material, a servo amplifier for amplifying the output signal of the tension transducer, and a tension control device for changing the tension in response to the output signal of the servo amplifier. Although these prior art devices perform their intended function, they do have several serious disadvantages which are inherent in servo systems of the above noted type. In the first place, the structure of these prior art devices is rather complicated, and they are therefore relatively expensive to manufacture and relatively difficult to maintain in operation. Furthermore, since they contain electrical circuits they are subject to failure through loss of electrical power or breakdown of electrical circuit components. In addition, their transient response is limited to a relatively slow speed, because of the separate feed back circuit, and they are subject to zero drift because of the electrical components in their feed back circuit. ("Zero drift" refers to an undesired change in the null output level of the servo system. For example, if the system starts out holding the tension at 45 pounds it might, through changes of temperature or voltage level, end up holding the tension at 50 pounds instead. In this case the zero or null output level is said to have drifted from 45 pounds to 50 pounds. This zero drift, it should be noted, does not have to be accompanied by any change in accuracy or response time, which are entirely different matters.)

Accordingly, one principal object of this invention is to provide a tension drive system and tension regulator mechanism for maintaining a constant, predetermined tension in a relatively thin material under wide variations in the driving force applied thereto or the load thereon.

Another principal object of this invention is to provide a tension drive system and tension regulator mechanism which is simpler in structure, faster in response, and more accurate in operation than those heretofore known in the art.

A further principal object of this invention is to provide a tension drive system and tension regulator mechanism which is lower in cost, more reliable in operation, and easier to maintain than those heretofore known in the art.

Other principal objects and advantages of the invention, as well as numerous secondary objects and advantages thereof, will be apparent to those skilled in the art from the following description of several specific embodiments thereof, as illustrated in the attached drawings, in which:

FIG. 1A shows a first general embodiment of the invention;

FIG. 1B shows a modification of the apparatus illustrated in FIG. 1A;

FIG. 2A is a side view of a second general embodiment of the invention;

FIG. 2B is an end view of the general embodiment shown in FIG. 2A;

FIG. 3 is a side view of a modification of the apparatus shown in FIG. 2A;

FIG. 4 is a side view of a third general embodiment of the invention;

FIG. 5 is a side view of a fourth general embodiment of the invention;

FIG. 6 illustrates a graphical solution for the reference force utilized in the apparatus of FIG. 5;

FIG. 12B is a graph of one reference force which can be utilized with the apparatus of FIG. 12A;

FIG. 13A shows a fifth general embodiment of the invention;

FIG. 13B is a graph of one reference force which can be utilized with the apparatus of FIG. 13A;

FIG. 14A shows a sixth general embodiment of the invention;

FIG. 14B is a graph of one reference force which can be utilized with the apparatus of FIG. 14A;

FIG. 15 shows a modification of the apparatus shown in FIG. 14;

FIG. 16 shows a seventh general embodiment of the invention;

FIG. 17A shows an eighth general embodiment of the invention;

FIG. 17B shows a more detailed view of the automatic control mechanism of FIG. 17A;

FIG. 18 shows a ninth general embodiment of the invention;

FIG. 19 shows a tenth general embodiment of the invention; and

FIG. 20 shows an apparatus for avoiding sag or relaxation in the thread or tape when it is started or stopped.

Figure 7:
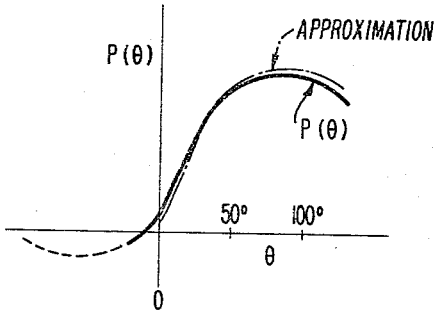
FIG. 7 is a graph of one reference force which can be utilized in the apparatus of FIG. 5.

In accordance with the tension drive system of this invention there is provided a means for applying a drive force to a relatively thin material and a means for developing a frictional restraining force on the relatively thin material when it moves in response to the drive force. The frictional restraining force, of course, opposes the driving force, but it is not large enough to stop the motion or to injure the material.

In accordance with the tension regulator mechanism of this invention, the frictional restraining force is variable as an inverse function of the tension in the material such that the restraining force drops when the tension increases and vice versa. Thus any changes of tension due to variations in the driving force or the load are counteracted by opposite changes in the frictional restraining force to hold the tension constant at a predetermined value. In the tension regulator mechanism of this invention the variation of tension is not detected in a separate tension transducer and coupled around a separate feedback path such as used in the prior art devices. Instead, the restraining force generator of this invention is adapted to perform all of the functions required to maintain a constant tension in the material. This eliminates many parts and makes the tension regulator of this invention simpler in structure, faster in response, lower in cost, more reliable in operation, and more accurate than those heretofore known in the art.

The null or zero output level of this invention is controlled by a highly stable reference force, such as the force of gravity, so that zero drift is reduced to a minimum. This reference force is used to press the moving material against a frictional surface, by way of a variable mechanical force coupling, to reduce the frictional restraining force. The variable force coupling is adapted to automatically vary its output in response to any changes of tension in the material so as to counteract those changes. Thus in this invention the changes of tension are detected directly by the means for counteracting those changes.

The means by which the above noted features of the invention are embodied will be better understood from the following description of the embodiments shown in the drawings. Referring to FIG. 1A, one general embodiment of the invention contains a tape or thread 1 which is moved from left to right on the drawing by a driving force applied by drive roller D, which can be driven by any suitable motor means. The tape or thread 1 is drawn from a storage reel R and is moved through a first fixed pulley 2, a floating pulley 3, and a second fixed pulley 4. The floating pulley 3, which is pulled downward by a weight 7, is positioned so as to rub the tape or thread 1 against a frictional rubbing block 5. If the tension in the string 1 is increased, floating pulley 3 will rise, thus decreasing the frictional force, and if the tension in string 1 is decreased, floating pulley 3 will drop, thus increasing the frictional force. The system will stabilize at a tension level given by the equation, $$T + \mu x = T_0 = \frac{W}{2} \quad (1)$$

where $T$ is the tension at the input side of the device, $T_0$ is the tension at the output side of the device, $\mu$ is the friction factor between the thread and the block 5, $x$ is the length of contact between thread 1 and block 5, and $W$ is the weight of weight 7. Therefore, it will be understood that when the input tension $T$ varies within $$\frac{W}{2} > T > \frac{W}{2} - \mu l \quad (2)$$

where $l$ is the total length of body 5, the balancing according to the Equation 1 is always established. In other words, the variation of the input tension $T$ within the Condition 2 is perfectly stabilized to $T_0 = W/2$ at the output side. This system is therefore a perfect tension servo system without a stationary error. The pulleys 2, 3 and 4 may be fixed guides having friction, which would increase the output tension but which would not alter the operation of the device or impair its regulating action.

FIG. 1B is a modification of the apparatus shown in FIG. 1A. The friction block 5 is inclined in this modification to make good contact, but the operation is similar to FIG. 1A.

FIGS. 2A and 2B show thread 1 being moved along a curved frictional block 8. From block 8 the thread 1 is pulled along a pulley 9 mounted on a lever 10 and then through a hole 11 cut in lever 10, which is rotatable around a shaft 12. From hole 11, thread 1 is introduced via a pulley 13 to the output side of the device.

The lever 10 is fixed to a wheel 14 which is driven to rotate counter-clockwise by means of a weight 7 which is coupled to wheel 14 through string 15. Therefore the tangential force at pulley 9 is a constant force F.

The tension $T_0$ of the thread 1 at the outlet from the frictional block 8 is therefore balanced out by F in accordance with the equations:

$$T_0 \sin ⊕ = F, \quad T_0 = T e^{\mu \theta} \quad (3)$$

$\mu$ is the friction factor between thread 1 and block 8, $e$ is the base of the natural logarithm, $T$ is the tension at the input of the device, $T_0$ is the tension at the output of the device, ⊕ is the angle between lever 10 and the point where string 1 leaves block 8, and $\theta$ is the angle of contact between string 1 and block 8.

It is clear from Equations 3 that the output tension $T_0$ will be constant over a wide range of variation in $\theta$, which can be varied from zero to more than 100°. Although the embodiment of FIGS. 2A and 2B is more complex than the embodiment of FIGS. 1A and 1B, it will handle larger variations of tension.

The pulley 9 may be a fixed guide, but the pulley 13 should not have any friction for accurate control. The hole 11 may be omitted, if desired, and thread 1 may be guided to pulley 13 by other means. The direction of thread travel may be reversed if desired. Instead of the weight 7 in FIGS. 1A, 1B and 2A, 2B, a torque motor, a spring, pneumatic force means, or the like can be used to generate the reference force.

FIG. 3 shows a modification of the apparatus shown in FIGS. 2A and 2B. This modification is adapted to handle flat material such as magnetic tape. An arcuate frictional block 8' is engaged by the tape 1. A crank 10' is used instead of the lever 10 in FIGS. 2A and 2B. The tape is guided along crank 10' by pulleys 9', 11', and 13'. The pulleys 9' and 13' correspond in function to the pulleys 9 and 13 of FIGS. 2A and 2B. Crank 10' is also attached to a wheel 14 which is driven to rotate as in the case of FIGS. 2A and 2B.

FIG. 4 shows the tape or thread 1 being moved around a curved frictional block 16 and through pulleys 21, 24 and 22. Pulleys 21 and 22 are mounted on a plate 23, and pulley 24 is floating as in the case of FIGS. 1A and 1B. The plate 23 is moved by two parallel arms 17 and 18, which are rotatable around pivots 19 and 20 on friction block 16. The tension in this system will be stabilized to $T_0 = W/2$ for the reasons described previously so long as the system 17, 18, 23, 24, and 7 can move freely. If desired, a spring 25 may be added to take up any slack when the tape 1 is stopped.

FIG. 5 shows another embodiment of the present invention. Thread or tape 1 is pulled along a frictional block 26 and pulley 29 mounted on a lever 28 rotatable around a pivot 27. From pulley 29 tape 1 is introduced to an outlet via a pulley 30, which is supported in a fixed position by means not shown. The pulley 29 is pulled to the right by a reference force P, which varies as a function of θ to balance out any variations of tension.

Now, for convenience, the system of FIG. 5 is again drawn as shown in FIG. 6 to indicate the force vectors. The force —P, equal and opposite to P, is balanced vectorically with $T_0$ as shown. $\overline{CQ}$ is the resultant of two $T_0$'s and its component perpendicular to $\overline{SC}$ is balanced by —P.

If the vectorial representation of FIG. 6 is drawn for different values of θ, and the force $T_0$ is held constant in each case, a curve of P versus θ will be obtained as shown in FIG. 7. The dotted lines and points B', C', and P' indicate the vectors for one different value of θ. Now the meaning of this P(θ) curve is apparent. Since the curve is based on the assumption that $T_0$ is constant, if the force P is varied in accordance with θ as shown in FIG. 7, the output tension $T_0$ must remain constant for variation of input tension T between $Te^{-\mu\theta_1}$ and $Te^{-\mu\theta_2}$, where $\theta_1$ and $\theta_2$ correspond to the upper and lower limit of variable θ. Therefore the apparatus shown in FIGS. 5 and 6 will regulate the tension just like the apparatus shown in FIGS. 1 to 4, but instead of using the force of gravity it will use a variable reference force P.

Figure 8:
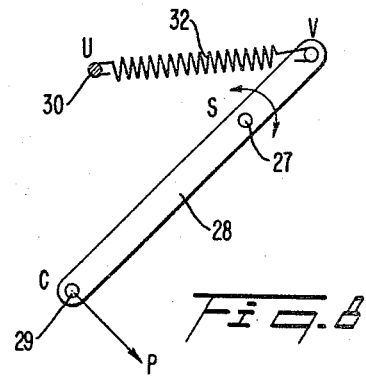
FIG. 8 shows a first reference force generator which can be utilized in the apparatus shown in FIG. 5.
Figure 9:
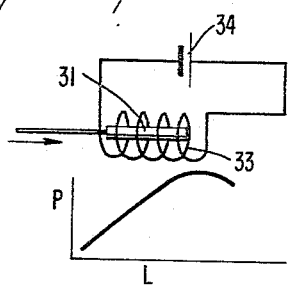
FIG. 9 shows a second reference force generator which can be utilized in the apparatus shown in FIG. 5.
Figure 10:
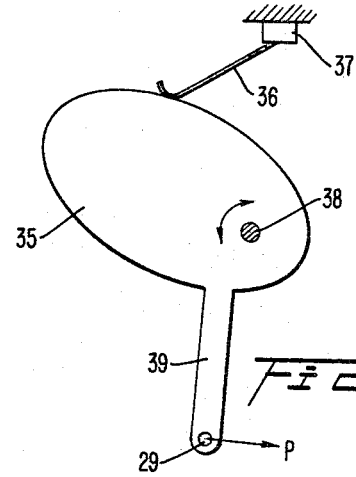
FIG. 10 shows a third reference force generator which can be utilized in the apparatus shown in FIG. 5.

The force function P(θ), which will be called the "reference force," can be generated quite simply in the arrangements shown in FIG. 8, 9, or 10. The simple arrangement shown in FIG. 8 gives a very good approximation to P(θ). The lever 28 of FIG. 5 is pulled at one end by a spring 32 having a fixed end 30. At the opposite end of the lever 28 the pulley 29 is mounted. For proper choice of angles, dimensions $\overline{SV}$, $\overline{UV}$, $\overline{SC}$, and the strength of the spring, a very good approximation of P(θ) can be obtained as shown by the dotted curve in FIG. 7. The specific parameters for the arrangement of FIG. 8 can be analytically or graphically obtained by well known prior art techniques. The wire spring 32 may be replaced with other forcing means, compressive or expansive. For example, weight, pneumatic means, electric apparatus or the like may be employed. Combination of several forces may be used. The system described with regard to FIG. 5 employing the reference force generator of FIG. 8 has a merit of quick response because a spring is used instead of a weight as shown in FIG. 1. Furthermore, the characteristic of the reference force favors the transient response because the reference force increases as the input tension increases.

FIG. 9 shows another method for obtaining the reference function P(θ). A solenoid coil 33 is energized by a battery 34. Iron plunger 31 is pulled into the solenoid. The pulling force on plunger 31 is as shown in the P—L curve, where P is the force on plunger 31 and L is the position of plunger 31. This force P can bear a close resemblance to that shown in FIG. 7 by the proper construction, as will be readily apparent to those skilled in the art.

Also a cam-spring mechanism shown in FIG. 10 can be employed to generate the reference function P(θ). In this mechanism a cam 35 is forced by a spring 36. Cam 35 is rotatable around pivot 38, and has a protruded portion 39 that carries the pulley 29 as shown in FIG. 5.

Figure 11:
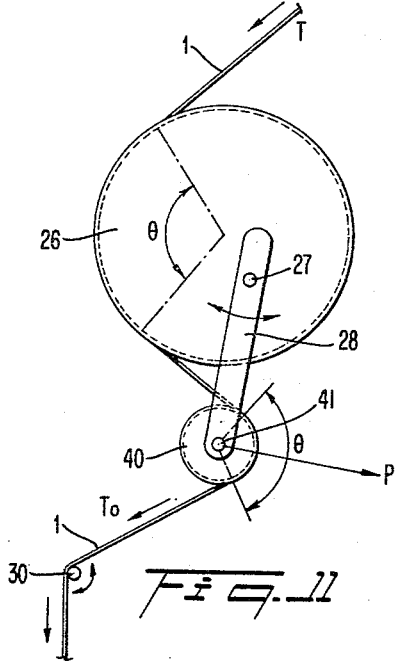
FIG. 11 shows a modification of the apparatus shown in FIG. 5.

In FIG. 11, the pulley 29 of FIG. 5 is replaced with a fixed guide 40 which is engaged with the thread 1 by a centre angle φ. The relation existing between the tension $T_0$ and $T_0'$ in this arrangment is $$T_0 = T_0' e^{\mu\phi} \quad (4)$$

φ and θ have a fixed relation.

The reference force P must be modified, in the arrangement of FIG. 11, according to the Equation 4, as will be readily apparent to those skilled in the art. The graphical solution is also possible in this case. The case in which the pulley 30 has friction can be solved by the same technique.

It is to be noted that the friction coefficient between the thread and the friction block as illustrated in the above embodiments can be varied by the several conditions such as the temperature and humidity without introducing any error in the output tension. However, the variation of the friction coefficient of the guide 40 in FIG. 11 can cause an error in the output tension of that particular embodiment.

Figure 12A:
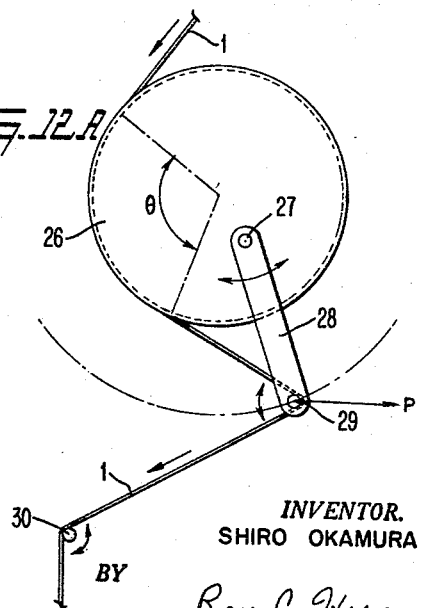
FIG. 12A shows another modification of the apparatus shown in FIG. 5.

FIG. 12A shows a modification of the arrangement of FIG. 5 which has a flat reference function P(θ) as shown in FIG. 12B. Such a proper choice of the dimensions and the position of the pivot 27 yields an approximately flat portion of P(θ) curve, as is illustrated in the region of θ=40°–120°. In this flat portion, a constant weight can be employed as in the case of FIGS. 1, 2 etc. In this arrangement, however, the portion of θ=0–40° adds an excess tension to the output, since it is not utilized in the control action.

FIG. 13A shows another variation of the embodiment shown in FIG. 5. The thread or tape 1 is introduced in the opposite direction to that shown in FIG. 5. The output tension $T_0$ is related to the input tension T by the equation.

$$T_0 = Te^{\mu\theta} \text{ or } T = T_0 e^{-\mu\theta} \quad (5)$$

The reference force P' required to stabilize $T_0$ can be derived by the graphical method or by calculation as in the case of FIG. 6. In this case, however, T must be varied according to the Equation 5 from $\theta_1$ to $\theta_2$. An example of P'(θ) is shown in FIG. 13B. The curve can also be approximated by the arrangements shown in FIGS. 8, 9 and 10. The stabilizing is effected by the variation of the friction factor between 1 and 26 as in the other embodiments.

FIG. 14A shows still another embodiment according to the present invention. A frictional block 42 is moved up and down in accordance with the variation of tension in thread or tape 1. The thread or tape 1 is guided via pulley 43, the block 42 and the pulley 44. The required reference force P can be obtained by the vectorical method as described above in connection with FIG. 6. An example of P(θ) for this particular arrangement is shown in FIG. 14B. This system is also affected by the variation of the friction factor.

FIG. 15 shows a modification of FIG. 14A. The frictional block 42 is moved by a lever 45 pivoted around an axis 46. The required reference force in this case can also be computed as noted above. The reference force P in the arrangement of FIG. 14B can also be approximated by the reference force generators shown in FIGS. 8, 9 and 10.

FIG. 16 shows a combination of the system of FIG. 5 and FIG. 13. The input tension $T_1$ to the cylinder 47 is stabilized with the aid of the lever 48 and the spring 50 after the manner described with respect to FIG. 13. The output tension $T_2$ is again stabilized with the aid of the lever 51 and the spring 52, after the manner described with respect to FIG. 5. The cylinder 47 may be the tape guide of a so-called single or two head video tape recorder.

FIGS. 17A and 17B show another embodiment of the tension regulator mechanism according to the invention. This embodiment contains two systems which are coupled together. The left system is the same as that shown in FIG. 5. The symmetrically disposed system at the right is the reference system. The right and left systems are connected by connecting means 64. The reference system can be identical with respect to the left system if the length of means 64 is properly adjusted, except that the moving thread 1 is replaced by the stationary thread 59 which is maintained in tension by weight 7. If the right and left systems are symmetrically arranged, by adjusting the length of means 64, the tension of the moving thread in the left system must have a constant tension equal to W, the weight of 7. Therefore the length of coupling means 64 must be automatically controlled in accordance with the variation of tension in the moving thread so as to make two systems symmetrical. An example of one automatic control system is shown in FIG. 17B. Because the coupling means 64 is pivotally connected to the levers 57 and 58 by means of pivots 68 and 69, if the left system is under the condition of output tension unequal to W, the unbalancing effect shifts the connector 64 to the right or left according as the output tension is smaller or larger than W respectively. This unbalance is detected by contacts 65, 66 and 67 causing a motor 70 to rotate to the proper direction and by a proper amount whereby the balancing condition is automatically established. The winding 78 of motor 70 is tapped at center and the screw shafts 73 and 74 have opposite screw threads as shown for this purpose.

The arrangements shown in FIGS. 18 and 19 utilize a different method of varying the frictional force. In the other embodiments the frictional force has been changed by varying the contact length between the thread and the friction block. In FIGS. 18 and 19, however, the friction is controlled by varying the pressure between the thread and the friction block. In FIG. 18 the friction between the thread or tape 1 and friction block 80 is controlled by a lever 83 pivoted at 82. Thread 1 travels around block 80, pulley 81 and pulley 82 to the outlet. The lever 83 is rotatively driven by a constant force by means of the wheel 79, thread 15, and weight 7 as in the case of FIGS. 2A and 2B. 91 and 92 are stoppers for lever 83. A small displacement of pulley 81 causes a large increase in friction between thread 1 and block 80. Therefore, by varying the contact pressure the output tension can be regulated to an approximately constant value corresponding to W. The rotation of the lever 83 is negligible during this regulating action.

The same principle is applied to structure of FIG. 19, which is a modification of the structure shown in FIG. 4. The contact pressure between tape 1 and the friction block 84 is controlled by this device so as to make the output tension a constant value ($W/2$) as explained previously.

The tension regulator of this invention can be embodied in many other ways. Of course, two or more embodiments can be combined if desired. The cylindrical friction block in FIGS. 2A and 2B may be rotated to give a large relative velocity between the thread and the block, if desired, to produce a constant dynamic friction factor. The pulleys or rollers may be replaced by fixed posts or guides except for the special case, i.e., the case in which the engaging angle varies, if the excess friction is not objectionable. If wear of the friction surface must be avoided, the friction block may be rotated or displaced automatically or manually. The friction block may be a form of tape, such as the ink ribbon of the typewriter.

For magnetic wire or the like, magnetic force can be utilized to make good contact between the wire and the friction surface. For dielectric film or tape electrostatic force may be employed for the same purpose. The reference force may be derived from weights, springs, solenoids, motors, pneumatic means, oil pressure apparatus, or the like. The mechanism of this invention may oscillate if the mechanical damping of the system is low; in this case appropriate damping means, such as oil dampers, air dampers, mechanical friction dampers, or the like may be added to the pivot of the lever, to the spring or to the weight. A little oscillation, however, might enhance transient response.

The tension regulator mechanism of the invention is useful in a very wide field of application. The moving material may be tape, wire, paper, thread, cloth, rope, or the like. The invention can be used in tape treating apparatus, coil winders, wire treating apparatus, metal plate treating devices, printing machines, paper fabrication, building machines, rope twisters, or the like. In all of these applications the tension is fully stabilized by the novel tension regulator of this invention and the production is performed quite uniformly.

In the case of recording tape treating apparatus, the lever system having non-linear force as shown in FIG. 7 is very favorable to prevent sag or relaxation of the tape. If such levers are employed in cascade, the build-up of the tape velocity from the standby condition becomes very excellent. FIG. 20 shows such apparatus, in which levers 93, 94 and 95 are rotatable about pivots 99, 100, and 101. The levers are spring loaded by springs 102, 103, and 104. Pulleys 96, 97, and 98 are engaged with the tape 1 as shown. If the tension in the tape becomes large, the levers tend to lie and the force applied to the tape by pulleys becomes small. This results in quick response and uniform tension when the tape is started or stopped. The apparatus of FIG. 20 can be used in connection with the tension regulator of this invention or independently as desired.

From the foregoing description it will be apparent that this invention provides a novel tension drive system and tension regulator mechanism which is simpler in structure, faster in response, and more accurate in operation than those heretofore known in the art. It will also be apparent that this invention provides a novel tension drive system and tension regulator mechanism which is lower in cost, more reliable in operation, and easier to maintain than those heretofore known in the art. And it should be understood that this invention is by no means limited to the specific embodiments disclosed herein by way of example. Many modifications can be made in the structure disclosed herein without departing from the basic teaching of this invention, which includes all modifications falling within the scope of the following claims.

I claim:

1. A tension regulator mechanism for smoothly regulating the tension in a relatively thin material, said mechanism comprising a friction generating element having a curved friction generating surface in contact with said relatively thin material, the region of contact between said surface and said thin material defining an angle $\theta$ at the center of said element, a movable guide member adjacent said friction generating element and adapted to engage said material against the tension force of said thin material as the same leaves said element, said guide member being adapted to vary said angle $\theta$ and the contact conditions between said material and said friction generating surface when moved, said guide member being movable in response to variations of tension in said material, reference force means coupled to said guide member, said reference force means comprising a force function generator coupled to said guide member, said force function generator producing a force which varies as a predetermined function of the angle $\theta$ to maintain the tension on said thin material at a constant value as the same leaves said friction generating element, said force function generator including a rigid lever mounted for pivotal movement, said movable guide member being fixed to said lever at a predetermined distance from the pivot point thereof, said force function generator further including a spring connected to said lever for varying the position of said lever and guide member to thereby exactly counter-act the force on said lever and guide member produced by the tension force in said thin material, whereby said mechanism has the characteristic of significantly improved transient response and maintains constant tension in said relatively thin material for a relatively wide variation in the external tension force existing in said thin material.

2. A tension regulator mechanism for smoothly regulating the tension in a relatively thin material, said mechanism comprising a friction generating element having a curved friction generating surface in contact with said relatively thin material, the region of contact between said surface and said thin material defining a contact angle $\theta$, a guide member adapted to engage said material adjacent said friction generating element, said guide member comprising a rotatable member mounted on a movable rigid arm, said guide member being adapted to vary said angle $\theta$ and the total contact friction between said material and said friction generating surface when moved, said guide member being movable in response to variations of tension in said material, reference force means coupled to said guide member, said reference force means comprising a force function generator, and said force function generator being constructed to produce a force which varies as a predetermined function of the angle $\theta$ to maintain the tension on said thin material at a constant value as the same leaves said friction generating element, said force function generator including said rigid arm, said arm being mounted for pivotal movement, said guide member being secured to said arm at one end thereof and at a predetermined distance from the pivot point thereof, said force function generator further including a spring connected to said arm at an end opposite said guide member for varying the position of said arm and movable guide member to thereby exactly counterbalance the force on said arm and guide member produced by the tension force in said thin material, whereby said mechanism has the characteristic of significantly improved transient response and maintains constant tension in said relatively thin material for a relatively wide variation in the external tension force existing in said thin material.

3. A tension regulator mechanism for smoothly regulating tension in a relatively thin material comprising a curved friction generating surface, means for driving said thin material in frictional contact with said friction generating surface, the region of contact between said surface and said thin material defining a contact angle $\theta$, guide means interlinked with said friction generating surface and movable in response to force variations between the tension of said thin material at the input of said regulator mechanism and the tension of said thin material at the output of said regulator mechanism, and means including a force function generator for generating a reference force which varies as a predetermined function of the angle $\theta$ and also having a magnitude and direction approximately equal and opposite, respectively, to the resultant force of the tension existing in said thin material at said input and output, said latter means being coupled to said guide means to cancel out the variations in the tension of said thin material so as to maintain the tension thereon at a constant value, said force function generator comprising a rigid lever pivoted to a fixed portion of said tension regulator mechanism and relatively movably interconnecting said friction generating surface and said guide means, and spring means operably connecting said lever and a point relatively adjustably fixed to said fixed portion in generally oblique relationship with respect to said lever and urging said lever against said resultant force with a force which is a function of the stress provided by said spring means and the angle formed between said spring means and said lever, whereby said mechanism has the characteristic of significantly improved transient response and maintains constant tension in said relatively thin material for a relatively wide variation in the external tension quence of the tension on said thin material, 4. A tension regulator mechanism for smoothly regulating the tension in a relatively thin elongated material, said mechanism comprising a friction generating element having a curved friction generating surface in contact with the thin material, said material being adapted for passage over said surface, the region of contact between said surface and said thin material defining a contact angle $\theta$, a movable guide member in the form of a pulley mounted for rotation on a movable rigid arm, said pulley being in bearing engagement with said thin material as the same emerges from contact with the curved surface of said friction generating element to produce a resultant force on said arm as a consequence of the tension on said thin material, and reference force means coupled to said pulley, said reference force means comprising a force function generator, said force function generator producing a force opposite to said resultant force which varies as a predetermined function of said angle $\theta$ and the position of said arm and pulley, to vary the length of contact of said thin material with said surface and thereby maintain the tension in said thin material at a constant value, said force function generator including said rigid arm, said arm being mounted for pivotal movement, said guide member being secured to said arm at one end thereof and at a predetermined distance from the pivot point thereof, said force function generator further including a spring connected to said arm at the end opposite said guide member for varying the position of said arm and movable guide member to thereby exactly counter-balance the force on said arm and guide member produced by the tension force in said thin material, whereby said mechanism has the characteristic of significantly improved transient response and maintains constant tension in said relatively thin material for a relatively wide variation in the external tension force existing in said thin material,

References Cited

UNITED STATES PATENTS

| 106,134 | 8/1870 | Dean | 242—75.2 |
| 1,596,095 | 8/1926 | Gehman | 242—154 |
| 1,599,455 | 9/1926 | Bruyere | 242—156.2 |
| 2,331,261 | 10/1943 | Wholton | 242—154 |
| 2,618,445 | 11/1952 | Buder | 242—154 |
| 2,757,433 | 8/1956 | Lenk | 242—154 X |
| 2,771,635 | 11/1956 | Munch | 242—154 |

FOREIGN PATENTS

| 999,361 | 10/1951 | France. |
| 1,049,855 | 8/1953 | France. |
| 365,980 | 1/1932 | Great Britain. |
| 523,580 | 7/1940 | Great Britain. |
| 833,425 | 4/1960 | Great Britain. |
| 446,866 | 3/1949 | Italy. |

OTHER REFERENCES

Pieper: German application 1,004,577 printed March 1957.

STANLEY N. GILREATH, *Primary Examiner.*

MERVIN STEIN, RUSSELL C. MADER, *Examiners.*